US006738843B2

(12) United States Patent
Bennett

(10) Patent No.: US 6,738,843 B2
(45) Date of Patent: May 18, 2004

(54) METHOD AND SYSTEM FOR GENERATING MULTIPLE SELF-ID PACKETS ON THE 1394 BUS USING A STANDARD PHY CHIP

(75) Inventor: Jeff Bennett, Spring Valley, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 502 days.

(21) Appl. No.: 09/790,427

(22) Filed: Feb. 22, 2001

(65) Prior Publication Data

US 2002/0152341 A1 Oct. 17, 2002

(51) Int. Cl.[7] ................................................ G06F 13/38
(52) U.S. Cl. ..................... 710/104; 709/227; 370/912; 713/202
(58) Field of Search ........................... 710/100, 4, 104, 710/9, 52, 63, 106; 709/224, 227, 221, 250, 253; 370/912, 257, 408, 429; 713/100, 202, 300; 340/825.52

(56) References Cited

U.S. PATENT DOCUMENTS 5,764,930 A * 6/1998 Staats
6,131,119 A 10/2000 Fukui .......................... 709/224
6,157,972 A * 12/2000 Newman et al.
6,314,461 B2 * 11/2001 Duckwall et al.

FOREIGN PATENT DOCUMENTS

EP 0994606 A2 8/1999 ........... H04L/12/46

* cited by examiner

Primary Examiner—Gopal C. Ray

(57) ABSTRACT

A method and system for generating multiple self-ID packets that are used for mapping a node topology is disclosed. The node topology is based on a computer system comprised of a high performance serial bus and a plurality of nodes coupled to the serial bus. Each node further includes an identification packet that is utilized for self-identifying itself on a network. In particular, a plurality of self-ID packets associated with the hardware actually present on the bus as well as a plurality of virtual nodes that are not actually present are generated during a self-ID process. Then, these self-ID packets are forwarded over the serial bus to identify themselves to other remaining nodes in the network. Thereafter, a topology mapping table from all of the self-ID packets is generated.

20 Claims, 6 Drawing Sheets

SELF-ID PACKET ZERO FORMAT

| Field | Derived From | Comment |
|---|---|---|
| 10 | | Self-ID packet identifier. |
| phy_ID | physical_ID | Physical node identifier of the sender of this packet. |
| L | link_active | If set, this node has an active Link and Transaction Layer. |
| gap_cnt | gap_count | Current value for the PHY_CONFIGURATION.gap_count field of this node. |
| sp | PHY_SPEED | Speed capabilities:<br>   00 98.304 Mbit/s<br>   01 98.304 Mbit/s and 196.608 Mbit/s<br>   10 98.304 Mbit/s, 196.608 Mbit/s, and 393.216 Mbit/s<br>   11 Reserved for future definition |
| del | PHY_DELAY | Worst-case repeater data delay:<br>   00 ≤ 144 ns (~14/BASE_RATE)<br>   01 Reserved<br>   10 Reserved<br>   11 Reserved |
| c | CONTENDER | If set and the link_active flag is set, this node is a contender for the bus or isochronous resource manager as described in 8.4.2. |
| pwr | POWER_CLASS | Power consumption and source characteristics:<br>   000 Node does not need power and does not repeat power<br>   001 Node is self-powered and provides a minimum of 15 W to the bus<br>   010 Node is self-powered and provides a minimum of 30 W to the bus<br>   011 Node is self-powered and provides a minimum of 45 W to the bus<br>   100 Node may be powered from the bus and is using up to 1 W.<br>   101 Node is powered from the bus and is using up to 1 W. An additional 2 W is needed to enable the link and higher layers.[a]<br>   110 Node is powered from the bus and is using up to 1 W. An additional 5 W is needed to enable the link and higher layers.[a]<br>   111 Node is powered from the bus and is using up to 1 W. An additional 9 W is needed to enable the link and higher layers.[a] |
| p0...p26 | NPORT, child [NPORT], connected [NPORT] | Port status:<br>   11 Connected to child node<br>   10 Connected to parent node<br>   01 Not connected to any other PHY<br>   00 Not present on this PHY |
| i | initiated_reset | If set, this node initiated the current bus reset (i.e., it started sending a bus_reset signal before it received one)[b]. (Optional. If not implemented, this bit shall be returned as a zero). |
| m | more_packets | If set, another self-ID packet for this node will immediately follow (i.e., if this bit is set and the next self-id packet received has a different phy_ID, then a self-id packet was lost). |
| n | | Extended self-ID packet sequence number (0 through 2, corresponding to self-ID packets #1 through #3). If n has the value of 3 through 7, then the rsv, pa-ph, r and m fields in figure 4-18 are reserved. |
| r, rsv | | Reserved for future definition, set to zeros |

FIG. 6

| Field | Derived From | Comment |
|---|---|---|
| 10 | | Self-ID packet identifier. |
| phy_ID | physical_ID | Physical node identifier of the sender of this packet. |
| L | link_active | If set, this node has an active Link and Transaction Layer. |
| Gap_cnt | gap_count | Current value for the PHY_CONFIGURATION.gap_count field of this node. |
| Sp | PHY_SPEED | Speed capabilities:<br>    00 98.304 Mbit/s<br>    01 98.304 Mbit/s and 196.608 Mbit/s<br>    10 98.304 Mbit/s, 196.608 Mbit/s, and 393.216 Mbit/s<br>    11 Reserved for future definition |
| bridge | | Bridge capabilities of the node:<br>    $00_2$ Not a bridge<br>    $01_2$ Reserved for future standardization<br>    $10_2$ Bridge complaint with this standard (unchanged net topology)<br>    $11_2$ Bridge complaint with this standard (changed net topology) |
| C | CONTENDER | If set and the link_active flag is set, this node is a contender for the bus or isochronous resource manager as described in 8.4.2. |
| pwr | POWER_CLASS | Power consumption and source characteristics:<br>    000 Node does not need power and does not repeat power<br>    001 Node is self-powered and provides a minimum of 15 W to the bus<br>    010 Node is self-powered and provides a minimum of 30 W to the bus<br>    011 Node is self-powered and provides a minimum of 45 W to the bus<br>    100 Node may be powered from the bus and is using up to 1 W.<br>    101 Node is powered from the bus and is using up to 1 W. An additional 2 W is needed to enable the link and higher layers.[a]<br>    110 Node is powered from the bus and is using up to 1 W. An additional 5 W is needed to enable the link and higher layers.[a]<br>    111 Node is powered from the bus and is using up to 1 W. An additional 9 W is needed to enable the link and higher layers.[a] |
| p0...p26 | NPORT, child [NPORT], connected [NPORT] | Port status:<br>    11 Connected to child node<br>    10 Connected to parent node<br>    01 Not connected to any other PHY<br>    00 Not present on this PHY |
| I | initiated_reset | If set, this node initiated the current bus reset (i.e., it started sending a bus_reset signal before it received one)[b] (Optional. If not implemented, this bit shall be returned as a zero). |
| M | more_packets | If set, another self-ID packet for this node will immediately follow (i.e., if this bit is set and the next self-id packet received has a different phy_ID, then a self-id packet was lost). |
| N | | Extended self-ID packet sequence number (0 through 2, corresponding to self-ID packets #1 through #3). If n has the value of 3 through 7, then the rsv, pa-ph, r and m fields in figure 4-18 are reserved. |
| r, rsv | | Reserved for future definition, set to zeros |

FIG. 7

METHOD AND SYSTEM FOR GENERATING MULTIPLE SELF-ID PACKETS ON THE 1394 BUS USING A STANDARD PHY CHIP

BACKGROUND OF THE INVENTION

1. Field of Invention

The present invention relates to a high performance serial bus, and more particularly, to a method of generating multiple self-ID packets over a high performance serial bus to map a node topology in a network.

2. Description of the Invention

In general, most of the digital electronic systems today typically utilize a common interconnection to share information between different components of the system. One type of the well-known system protocols that may be used in this type of interconnection system is set forth in the IEEE High Performance Serial Bus 1394 standard, which is incorporated herein by reference. Basically, the 1394 standard defines, as shown in FIG. 1, a three-layered system including a physical layer, a link layer, and a transaction layer. The function of the physical layer 10 is to specify the signals required in the 1394 bus, the link layer 12 provides the means to format the data from the physical layer into recognizable data packets, the transaction layer 14 forwards the data received from the link layer to an application, and the serial bus management block 16 provides the basic control functions and manages the bus resources.

Referring to FIG. 2, the function of these different layers is implemented in the dedicated, integrated circuits 20, each having one or more I/O circuits. The physical layer connected to the 1394 bus 22 can be implemented in a physical layer chip 24, or "PHY chip." The link layer can be implemented in a link chip 26. As set forth under the IEEE 1394 standard, the PHY chip serves to transmit and receive I/O signals and performs system initialization, bus arbitration, and the associated handshaking to transmit data over the bus. Accordingly, the 1394 standard defines an electrical and physical interface, including various signaling and data transmission protocols, for interconnection of the 1394 devices (or nodes) via cables or an electrical backplane in point-to-point links. The 1394 standard allocates up to 63 nodes to be connected to a single 1394 bus, and also multiple buses may be interconnected via 1394 bridge nodes. There are three possible speeds at which data packets can be transmitted between nodes on the bus. They are 100, 200, and 400 megabits per second. The speed at which a data packet can be transmitted depends on the bus topology and the data transmission speeds supported by various nodes on the bus. Here, a topological map of the bus network is required in order to determine the optimum packet transmission speed.

In addition, reconfiguration of the serial bus is required whenever a node is added to or removed from the 1394 bus. The reconfiguration (or bus reset) is necessary to ensure that all nodes of the serial bus are notified of the newly connected or disconnected node. To this end, each node has a unique bus address. Three stages of the configuration process include bus initialization, tree identification (tree-ID), and self identification (self-ID) phases. During the bus initialization stage, a bus reset signal forces all nodes to clear all topology information of the network. At this time, the only information known to a node is whether it is a branch (more than one directly connected neighbor), a leaf (only a single neighbor), or isolated (unconnected). Thereafter, the tree-ID process translates the network topology into a tree, where one node is designated a root and the remaining connections are labeled as a "parent" (a node that is closer to the root node) and "child" (a node that is further from the root node). Finally, each node is assigned to a unique self-ID for identifying purposes to any management entity attached to the bus so that a system topology map can be built. The self-ID process uses a deterministic selection process where the root node passes control of the media to the node attached to its lowest-numbered connected port and waits for that node to signal that it and all of its children have transmitted their self-ID packets. The root then passes control to its next highest port and waits for that node to finish. When the nodes attached to all the root's ports have finished, the root itself transmits its self-ID packet. The child nodes use the same process in a recursive manner.

During the self-ID phase, a unique physical ID is assigned to each node, and each node on the bus is given an opportunity to transmit one to four short packets onto the 1394 cable which includes the physical ID, port connection status, and some additional management information. Here, the physical ID is simply the count of the number of times a node passes through the state of receiving self-ID information before having its own opportunity to do so. Accordingly, as all information necessary to determine the bus topology is contained in the self-ID packet, power management can be performed and bus topological information can be obtained.

The conventional physical layer implemented by a PHY chip as set forth under the IEEE 1394 standard has some drawbacks in supporting the configuration management of a 1394 high performance. The 1393 PHY chip participates in the self-ID process by broadcasting a set of self-ID packets (one or four packets, depending on the number of its ports) that associates with the corresponding single node. However, the 1394 PHY chip can represent only one node. Thus, if a need arises to send a self-ID packet with some modification of information thereto, additional 1394 PHY chips are required as the bit information in the self-ID packet is unchangeable.

Therefore, what is desired are some efficient methods and apparatuses for providing I/O circuits for use with a PHY circuit, wherein the I/O circuits are capable of generating multiple self-IDs corresponding to multiple nodes utilizing a single 1394 PHY chip.

SUMMARY OF THE INVENTION

It is, therefore, an objective of the present invention to provide a configuration management for a high performance serial bus by generating multiple self-ID packets on a 1394 bus using a standard PHY chip.

It is another objective of the present invention to efficiently build and represent a topological map of the bus network including actual nodes connected to the bus as well as virtual nodes that are not actually present in the network.

BRIEF DESCRIPTION OF THE DRAWINGS

The above and other objectives, features, and advantages of the present invention will become more apparent from the following detailed description when taken in conjunction with the accompanying drawings, in which:

FIG. 6 illustrates a standard format of the self-ID packet as set forth under the IEEE 1394 standard;

FIG. 7 illustrates a non-standard format of the self-ID packet according to the present invention; and, FIG. 8 illustrates a flow chart depicting the operation of the block diagram of FIG. 3.

DETAILED DESCRIPTION OF THE PREFERRED EMBODIMENT

In the following description, for purposes of explanation rather than limitation, specific details are set forth such as the particular architecture, interfaces, techniques, etc., in order to provide a thorough understanding of the present invention. However, it will be apparent to those skilled in the art that the present invention may be practiced in other embodiments which depart from these specific details. Moreover, for the purpose of clarity, detailed descriptions of well-known devices, circuits, and coding techniques have not been described in detail in order not to unnecessarily obscure the present invention.

Figure 1:
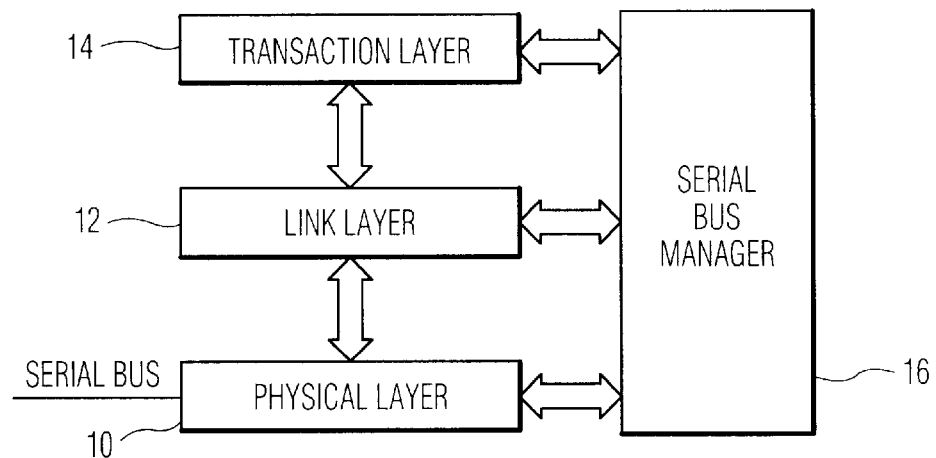
FIG. 1 is a block diagram illustrating a three-layered system as set forth under the IEEE-1394 standard.
Figure 2:
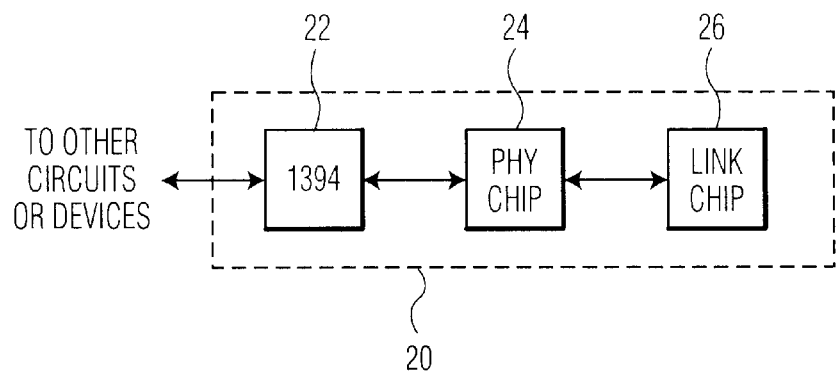
FIG. 2 is a block diagram illustrating a prior-art interface as set forth under the IEEE-1394 standard.
Figure 3:
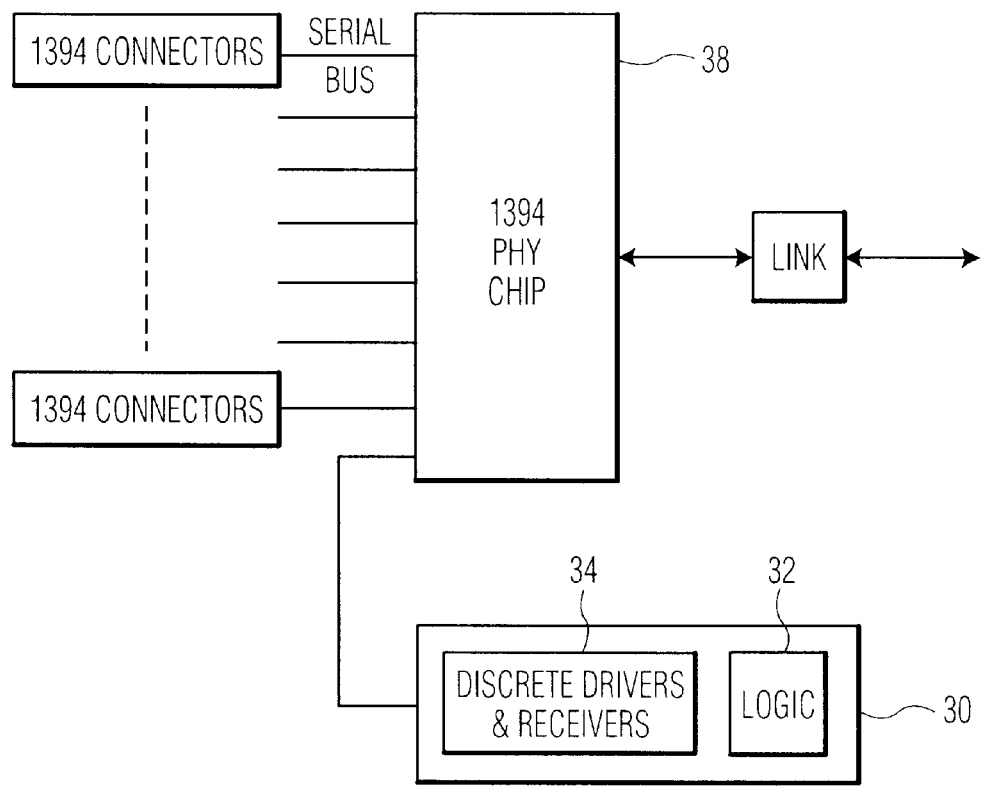
FIG. 3 is a simplified block diagram illustrating the physical and link layers according to the embodiment of the present invention.

Referring now to the figures, and in particular to FIG. 3, discrete circuitry 30 in which the present invention can be employed is depicted. As shown, the present invention includes the discrete circuitry 30, which consists of a logic circuit 32 and a discrete driver/receiver 34, a LINK chip 36, a PHY chip 38, and a plurality of 1394 connectors coupled to the PHY chip 38. In the embodiment of the present invention, the circuitry 30 may be implemented utilizing programmable logic arrays that are adapted to operate different applications. The programmable logic arrays are well known in the art to operatively configure for a particular function. Here, the discrete circuitry 30 is programmed to recognize the 1394 bus reset and self-ID protocol. The discrete driver and receiver 34 is provided in the circuitry 30 to adjust the output signals of the logic circuits 32 to match the required voltage under which the PHY chip 38 is designed to be operative. The PHY chip 38 is configured to support the IEEE 1394 standard buses and communications. Basically, the PHY chip includes I/O circuits that are dedicated to driving I/O signals over the bus in a differential mode. The LINK chip 36, which is usually a digital logic circuit, is essentially the hardware implementation of the link layer and provides packetized data transfers.

Figure 4:
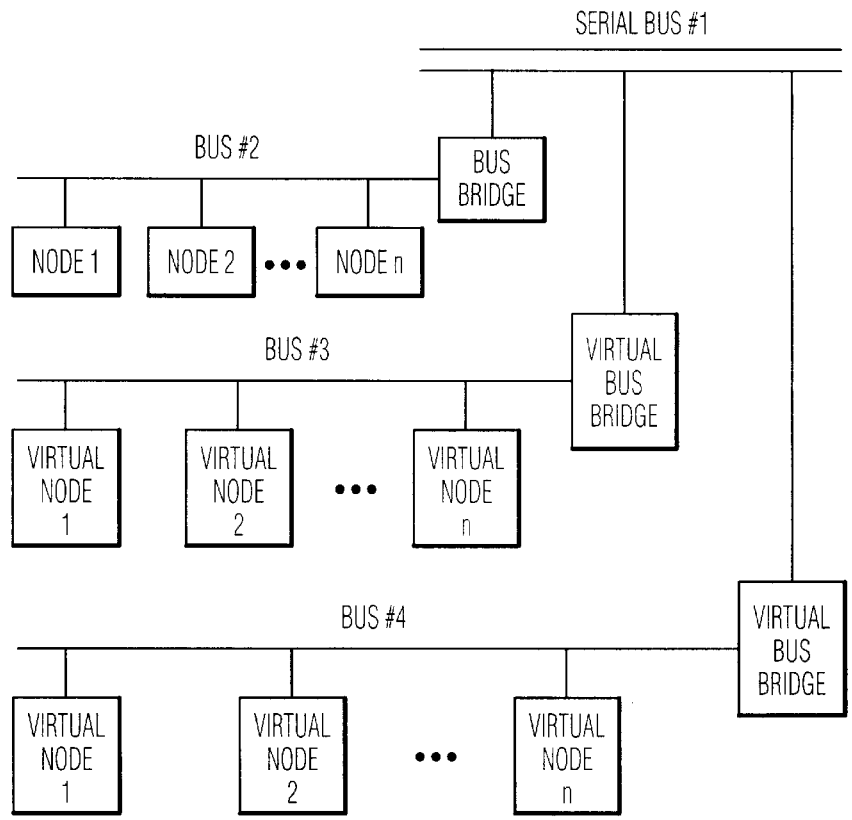
FIG. 4 illustrates a diagrammatic view of the bus topology applicable under the present invention.

As shown in FIG. 3, the discrete circuitry 30 is directly connected to one of the ports of the standard 1394 PHY chip. However, it should be noted that the discrete circuitry may be connected over a standard 1394 cable or connector. Referring to FIG. 4, the bus architecture according to the present invention comprises a plurality of nodes (bus #2) and a plurality of virtual nodes (bus #3 and bus #4) which are interconnected together. In the embodiment of the present invention, multiple self-ID packets corresponding to the nodes including virtual bus bridges are generated for mapping a node topology of the bus network. Accordingly, the present invention can simulate nodes (or devices) representing more than one node without the need to require additional PHY chips. It should be noted that FIG. 4 is an illustrative example of a bus topology and that this example is just one possible cable configuration. Thus, if this topology were different, the information in the self-ID packets also would be different.

As shown in FIG. 4, the nodes connected to the bus #2 represent the actual interconnected 1394 devices in the network, where as the virtual nodes connected to the virtual bus bridge represent simulated devices that are not actually present in the multiple bus systems. Accordingly, various simulation tests incorporating these virtual nodes can be performed to efficiently build a system topology map. Hence, a network topology of nodes including the virtual nodes is translated into the physical point-to-point topology expected by higher layers.

Unlike the prior art system where a plurality of 1394 PHY chips is required to participate in the completion of the self-ID process, the present invention can generate multiple self-ID packets corresponding to more than one node using only a single 1394 PHY chip. To this end, the discrete circuitry 30 generates a plurality of self-ID packets during the bus initialization process corresponding to various nodes including the virtual nodes shown in FIG. 4. Accordingly, the discrete circuitry 30 is programmed to recognize the 1394 bus reset and perform the self-ID process. Meanwhile, the 1394 PHY chip coupled to the discrete circuitry 30 would pass the data transfers to/from these virtual nodes to the LINK chip 36. The self-ID packets responsive to the virtual nodes may contain non-standard bits (explained later) that are not obtainable from the standard 1394 PHY chip. Therefore, the standard 1394 PHY chip equipped with the discrete circuitry 30 according to the present invention participates in the self-ID process by broadcasting more than one set of self-ID packets, each set of which represents more than one node.

Figure 5:
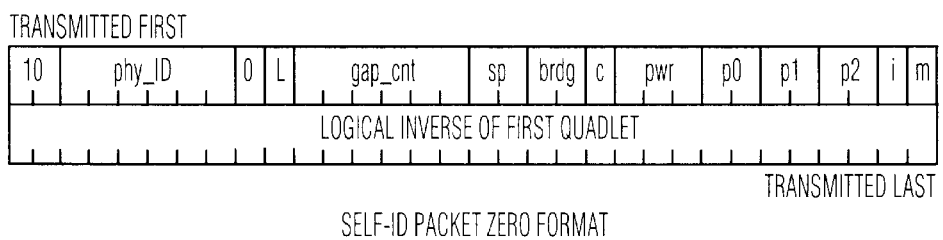
FIG. 5 illustrates a diagrammatic view of a self-ID packet according to the present invention.

Referring to FIG. 5, there is illustrated a diagrammatic view of the physical layer of a self-ID packet according to the present invention. Typically, the physical layer sends one to four self-ID packets at the base rate during the self-ID phase of arbitration. Here, the number of self-ID packets sent depends on the maximum number of ports it has. Subsequent to a bus reset during the bus initialization phase, it is determined whether bridge portals have been inserted or removed to reflect a change in the network topology and thereafter to rapidly select one portal to coordinate the update on the just-reset bus. Thus, the self-ID packets generated according to the present invention provide rapid and effective access information after the bus reset to determine the speed capabilities of each data path. These self-ID packets are slightly modified to include information that distinguishes bridge portals from other serial bus nodes.

As shown in FIG. 5, the format of the initial self-ID packet zero ("#0") according to the present invention replaces one particular field from the standard self-ID packet, which is specified by the IEEE Std 1394a-1995, and the remaining self-ID packets (not shown) are labeled "#1," "#2," and "#3." FIG. 6 illustrates the self-ID packet as set forth under the IEEE Std 1394a-1995, whereas FIG. 7 illustrates the self-ID packet format according to the proposed P1394.1 standard. Namely, the self-ID packet zero illustrated by FIG. 5 replaces the "del" field of the IEEE Std 1394a-1995. Two bits previously reserved by the IEEE Std 1394-a-2000 are redefined by P1394.1 standard to become the bridge-capability field, "brdg." The table 1 below enumerates the values of this field.

TABLE 1

Bridge-capability field in self-ID packet zero

| Field | Derived From | Comment |
| --- | --- | --- |
| bridge | | Bridge capabilities of the node:<br><br>$00_2$ Not a bridge<br>$01_2$ Reserved for future standardization<br>$10_2$ Bridge compliant with this standard (unchanged net topology)<br>$11_2$ Bridge compliant with this standard (changed net topology) |

The value of the "brdg" field shall be ignored if the L bit in the self-ID packet is zero. The bridge portal determines changes in the net topology (or lack thereof) with respect to its state. As described in the preceding paragraphs, the self-ID process uses a deterministic selection approach where the root node waits for its children to transmit their self-ID packets and thereafter passes its self-ID packet to its next highest port. The destination address for a bus transaction must include a 10-bit bus ID and a 6-bit physical ID of the destination node. The bus ID uniquely specifies a particular bus within a system of multiple interconnected buses, whereas the physical ID is simply the count of the number of times a given node passes through the state of receiving self-ID information during the self-identifying process following a bus reset before having its own opportunity to send self-ID information. Thus, during the self-ID process, the first node sending self-ID packets chooses 0 as its physical ID. The second node chooses 1, and so on. Accordingly, both the bus ID and the physical ID are subject to change upon each occurrence of a bus reset.

Figure 8:
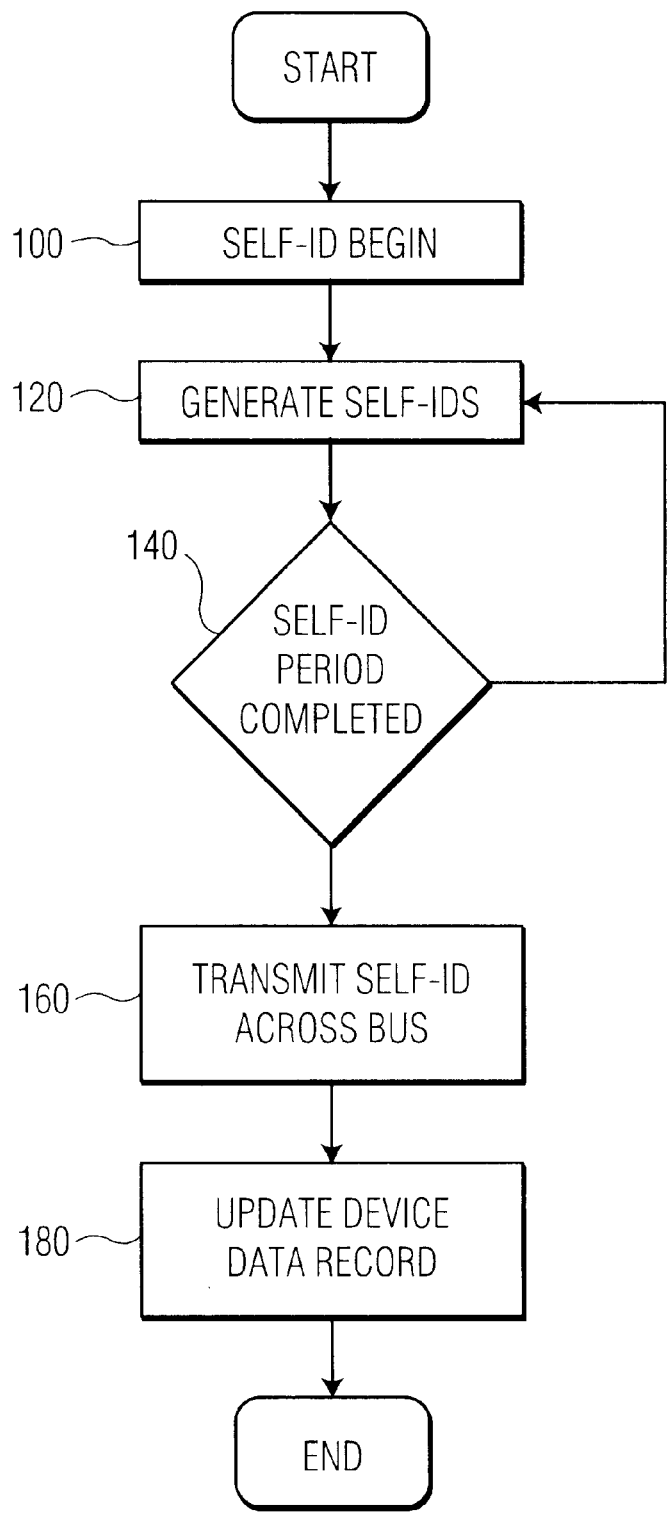

With reference to FIG. 8, there is illustrated a flow chart showing the operation of the resource manager processor. The implementation of the flow chart is facilitated with an ASIC (Application Specific Integrated Circuit) shown in FIG. 3. It should be noted that this process flow can be implemented in the initial design of the ASIC which involves the generation of various hardware configurations, implementation of various logic gates, etc. is well known in the art. The process is initiated at step 100 wherein the self-ID process is initiated. Upon system start-up, the nodes of the bus are scanned and the virtual nodes are generated. Here, the scanning processes in general are well known in the art. In step 120, self-ID packets are generated at a relatively high speed. Preferably, a standard 1394 self-ID packet shown in FIG. 6 may be used in the event that only one virtual self-ID packet is generated, whereas a non-standard self-ID packet shown in FIG. 7 may be used if multiple virtual self-ID packets are generated. At this point, the program will flow to step 140 to determine if the self-ID period is complete. In step 160, the generated self-ID packets are transmitted to the link layer over the bus. Here, the bus transactions involve data packet transmission, wherein data packets are propagated throughout the serial bus using a number of point-to-point transactions. A node that receives a packet from another node via a first point-to-point link retransmits the received packet via other point-to-point links. At this stage, the topology map of the network devices is updated in step 180. Finally, the program flows to step 200 to end the process.

In summary, there has been provided a serial bus system operating under the IEEE 1394 standard for processing the self-ID packets received over the bus during a bus initialization process.

While the present invention is described hereinafter with particular reference to the system block diagram of FIG. 3, it is to be understood at the outset of the description which follows that the apparatus and methods in accordance with the present invention may be used with other hardware configurations of the planner board. Hence, the present invention may be applied to any arbitrarily assembled collection of nodes linked together as in a network of electronic devices.

What is claimed is:

1. A method for generating packetized identification information used for mapping a node topology in a network, comprising the steps of:

initiating a bus transaction over a serial bus carrying data packets, said data packets including self-ID packets that are utilized by each node for self-identifying itself on said network;

generating a plurality of first self-ID packets by one physical layer (PHY) chip associated with a plurality of nodes on said serial bus and providing a multiple self-ID generating I/O circuit that is in communication with a port of the one PHY chip, wherein the multiple self-ID generating I/O circuit generates a plurality of second self-ID packets associated with a plurality of virtual nodes during a self-ID process; and, transmitting said first self-ID packets and said second self-ID packets over said serial bus via the one PHY chip to identify themselves to other remaining nodes in said network.

2. The method of claim 1, further comprising the steps of:

monitoring said self-ID packets received from said serial bus during said self-ID process; and, generating a topology mapping table from all of said self-ID packets associated with each node of said plurality of nodes and said virtual nodes.

3. The method of claim 1, further comprising the steps of:

maintaining a count of said self-ID packets received from said serial bus; and, determining the number of nodes on said bus from which self-ID packets were received so that a count of the nodes can be maintained at each node.

4. The method of claim 1, wherein said first self-ID packets responsive to said plurality of nodes are generated in accordance with the standard set forth under 1394 IEEE High Performance Serial Bus.

5. The method of claim 1, wherein said second self-ID packets responsive to said plurality of virtual nodes are generated in accordance with predetermined criteria.

6. The method of claim 1, wherein said serial bus is an IEEE 1394 bus.

7. A computer-readable medium comprising:

computer readable instructions which, when executed by a processor coupled to a bus, cause said processor to perform the computer implemented steps of:

initiating a bus transaction over a serial bus carrying data packets, said data packets including self-ID packets that are utilized by each node for self-identifying itself on said network;

generating a plurality of first self-ID packets by one physical layer (PHY) chip associated with a plurality of nodes on said serial bus and providing a multiple self-ID generating I/O circuit that is in communication with a port of the one PHY chip, wherein the multiple self-ID generating I/O circuit generates a plurality of second self-ID packets associated with a plurality of virtual nodes during a self-ID process; and, transmitting said first self-ID packets and said second self-ID packets over said serial bus via the one PHY chip to identify themselves to other remaining nodes in said network.

8. The computer readable medium of claim 7, further executing the steps of:
monitoring said self-ID packets received from said serial bus during said self-ID process; and,
generating a topology mapping table from all of said self-ID packets associated with each node of said plurality of nodes and said virtual nodes.

9. The computer readable medium of claim 7, further executing the steps of:
maintaining a count of self-ID packets received from said serial bus; and,
determining the number of nodes on said bus from which self-ID packets were received so that a count of the nodes can be maintained at each node.

10. The computer readable medium of claim 7, wherein said first self-ID packets responsive to said plurality of nodes are generated in accordance with the standard set forth under the 1394 IEEE High Performance Serial Bus.

11. The computer readable medium of claim 7, wherein said second self-ID packets responsive to said plurality of virtual nodes are generated in accordance with predetermined criteria.

12. The computer readable medium of claim 7, wherein said serial bus is an IEEE 1394 bus.

13. An apparatus for generating self identification (ID) information over a serial bus carrying data packets, said self-ID information is utilized by each node in a network for self-identifying on said network, comprising:
a bus interface for interfacing to said serial bus;
a first means comprising one physical layer (PHY) chin for generating a plurality of first self-ID packets associated with a plurality of nodes that are actually present on said serial bus; and,
a second means comprising a multiple self-ID generating I/O circuit that is in communication with a port of the one PHY chip, wherein the multiple self-ID generating I/O circuit generates a plurality of second self-ID packets associated with a plurality of virtual nodes on said network;
wherein said first and second plurality of self-ID packets comprise data placed on said serial bus via the one PHY chin for transmission to other nodes on said serial bus to identify those other nodes to all remaining nodes on said serial bus.

14. The apparatus of claim 13, further comprising:
means for maintaining a count of said self-ID packets received from said serial bus and determining the number of nodes on said serial bus from which self-ID packets were received, such that a count of the nodes can be maintained at each node.

15. The apparatus of claim 13, further comprising:
means for monitoring said self-ID packets received from said serial bus during a self-ID process; and,
means establishing a node topology of said network from all said self-ID packets associated with each node of said plurality of nodes and said virtual nodes.

16. The apparatus of claim 13, wherein said first self-ID packets responsive to said plurality of nodes are generated in accordance with the standard set forth under the 1394 IEEE High Performance Serial Bus.

17. The apparatus of claim 13, wherein said second self-ID packets responsive to said plurality of virtual nodes are generated in accordance with predetermined criteria.

18. The apparatus of claim 13, wherein said serial bus is an IEEE 1394 bus.

19. The apparatus of claim 13, wherein said first means is electrically connected to at least one 1394 connector for externally-removable nodes in said network.

20. The apparatus of claim 13, wherein said multiple self-ID generating I/O circuit comprises:
a logic circuit for generating a plurality of self-ID packets; and
a discrete driver and receiver circuit which causes said second generating means to adjust output signals of the logic circuit to match the required voltage under which the one PHY chip operates.

* * * * *